(12) United States Patent
Schultz

(10) Patent No.: US 6,223,044 B1
(45) Date of Patent: Apr. 24, 2001

(54) ADAPTIVE LOCATION LEVEL

(75) Inventor: Per Johan Schultz, Linköping (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/323,267

(22) Filed: Jun. 1, 1999

Related U.S. Application Data

(63) Continuation of application No. PCT/IB98/02074, filed on Dec. 18, 1998.

(51) Int. Cl.[7] .................................................... H04Q 7/20
(52) U.S. Cl. ........................ 455/456; 455/458; 455/435; 455/432; 455/441
(58) Field of Search ................................... 455/432, 434, 455/435, 458, 456, 524, 525, 440, 441

(56) References Cited

U.S. PATENT DOCUMENTS

| | | |
|---|---|---|
| 5,054,110 | 10/1991 | Comroe et al. . |
| 5,153,902 * | 10/1992 | Buhl et al. ............................ 379/57 |
| 5,212,822 * | 5/1993 | Fukumine et al. .................. 455/33.1 |
| 5,289,527 | 2/1994 | Tiedemann, Jr. . |
| 5,365,451 | 11/1994 | Wang et al. . |
| 5,408,683 * | 4/1995 | Ablay et al. ....................... 455/33.1 |
| 5,561,840 * | 10/1996 | Alvesalo et al. ................... 455/33.1 |
| 5,579,374 * | 11/1996 | Doi et al. ............................. 379/59 |
| 5,588,043 * | 12/1996 | Tiedemnn, Jr. et al. ............. 379/63 |
| 5,642,398 | 6/1997 | Tiedemann, Jr. et al. . |
| 5,732,387 | 3/1998 | Armbruster et al. . |
| 5,758,283 * | 5/1998 | La Fratta .............................. 455/435 |
| 5,822,694 * | 10/1998 | Coombes et al. .................... 455/433 |
| 5,828,958 | 10/1998 | Ishida et al. . |
| 5,832,381 | 11/1998 | Kauppi . |
| 5,974,328 * | 10/1999 | Lee et al. ............................ 455/456 |
| 5,983,118 * | 11/1999 | Lee ....................................... 455/562 |
| 6,023,624 * | 2/2000 | Hanson ................................. 455/458 |
| 6,038,445 * | 5/2000 | Alperovich et al. ................. 455/422 |
| 6,058,311 * | 5/2000 | Tsukagoshi .......................... 455/435 |

FOREIGN PATENT DOCUMENTS

| | | |
|---|---|---|
| WO 94/07337 | 3/1994 | (WO) . |
| WO 95/11577 | 4/1995 | (WO) . |
| WO 98/36603 | 8/1998 | (WO) . |

OTHER PUBLICATIONS

Sami Tabbane, "Location Management Methods For Third-Generation Mobile Systems," IEEE Communications Magazine, Aug. 1997, pp. 72–78 & 83–84.

Hu et al., "An Adaptive Location Management Scheme For Global Personal Communications," IEEE International Conference on Universal Personal Communications, Jun. 1995, pp. 950–954, (XP000690091).

* cited by examiner

*Primary Examiner*—Fan Tsang
*Assistant Examiner*—Marceau Milord
(74) *Attorney, Agent, or Firm*—Nixon & Vanderhye P.C.

(57) ABSTRACT

The present invention involves apparatus and method for providing page messages to mobile radios based on the mobility rates of the mobile radio. For mobile radios that are relatively stationary, page messages are sent to a cell in which the mobile radio resides, while radios which are increasingly mobile receive their page messages on a local area basis. The mobile radio only performs location updates when the situation is optimized for doing so depending upon the mobility of the radio, the introduction of a new cell, the introduction of a new location area, the expiration of a pre-determined time limit and the status of a new cell location flag. A function is defined for location updating on either a locationary basis or a cell basis in accordance with each of the above factors in order to optimize the burden of location area updating and unwanted page broadcasting.

31 Claims, 4 Drawing Sheets

Fig. 2

| previous location level | new cell, old LA | old cell, new LA | new cell, new LA | timer expired |
|---|---|---|---|---|
| LA | no action  13 | loc update (LA)  16 | loc update (LA)  19 | *  22 |
| cell | loc update (LA)  14 | no action  17 | loc update (LA)  20 | no action  23 |

10  12  15  18  21
11

* If the flag is not set do location update on cell level, else no action.

ADAPTIVE LOCATION LEVEL

This application is a continuation of PCT/IB98/02074, filed Dec. 18, 1998.

FIELD OF THE INVENTION

This invention relates to telecommunication systems and more particularly to page messaging for mobile radio systems.

BACKGROUND AND SUMMARY OF THE INVENTION

Mobile radio telecommunication systems were made up of a cellular structure in which mobile radios move in and out of geographically defined "cells." As it turns out, some mobile radios are more or less mobile than others within the cell structures. Some radios, for example, may be used in more mobile applications and therefore travel across new cell boundaries on the order of every few minutes. A simple mobile radio may also be highly mobile at one time (for example during traditional commuting hours) and less mobile just an hour later.

The mobile radio network is designed to communicate with the mobile radios via broadcast systems within the cell structure. Thus, in an example embodiment, each cell in a geographic area may be serviced by a single base station and each of the base stations in a predefined area may be serviced by a mobile radio switching center. In this example embodiment, the base stations define the cell geographic areas based on the transmission distances and characteristics associated with the respective base station in the cell. Similarly, the mobile radio switching center may define a location area which is geographically defined based on optimal traffic characteristics between the mobile radio switching center and the base stations in the location area.

The mobile radio switching center serves two important functions vis-a-vis any particular mobile radio. First, it keeps a more or less accurate record of the mobile radios location within the cellular structure, in order to be able to find the mobile radio when an incoming call for the mobile radio is received. One method of location updating is for the mobile radio to periodically inform the network of its location. Depending upon the period of location updates, this method may provide good location information for each mobile radio, but does so by burdening the system resources with multiple location update transmissions. Many schemes have been developed to balance and optimize the desirability for increased location knowledge with minimization of the burden of location updating.

Another important process of the mobile radio switching center is paging. The mobile radio switching center sends a page message to a mobile radio whenever an incoming call is received for that mobile radio. This process is well-known and understood in the art. The page message for any particular mobile radio is sent to a location area defined by a number of cells in a neighborhood of cells associated with the last known location of the mobile radio. In this context, the location area is by definition that group of cells (one or more) in which the mobile station may move freely within and still not update the network as to its new location. In essence, the location area becomes the smallest area known to the network where a specific mobile station immediately resides. This grouping of a number of cells into a location area for paging purposes is a known technique.

Another paging technique is described in U.S. Pat. No. 5,289,527, where all cells have a published geographical position and the registration of a mobile radio is valid within a certain radius of that cell position. There, the mobile station will register whenever it moves into a new cell that is greater than the radio distance from the previous cell where it had earlier registered.

In systems where location areas are the smallest known location that a mobile station resides (whether the location area is pre-determined or dynamically determined), the paging message for a particular mobile station is sent on the paging channel to all cells in the location area. Although the page is sent to all cells in the location area, many of the pages on the paging channel will be wasted since the mobile station will only receive one of the messages sent, i.e., the one message sent to the one cell where the mobile station actually resides. That is, the mobile station can only be in one cell at a time and thus will receive one page message from the network even though the network is sending the page message to multiple cells within the location area. All messages sent into cells where the mobile station does not reside for purposes of paging the mobile station represent an unnecessary load on the page control channel.

Of course, the page load can be reduced if the location registration load is increased, meaning that the page load to unnecessary cells will be removed if the system knows the exact location of the mobile station on a cell level based on an increase in location updates. To ensure that pages are focused to areas where a mobile station resides, a location update would have to occur relatively frequently, for example, every time a mobile station entered a new cell. This represents a large location update burden on the system. Balancing the location update cost/burden and the page cost/burden is discussed at length in *Location Management Methods For Third-Generation Mobile Systems*, IEEE Communications Magazine, August 1997. A balance between the location update mode and the page load is needed, but the prior art teaches that one load (either location update or page) cannot be reduced without the other load being increased.

However, if the mobility of the various radios are taken into account, then the page system can be customized to the particular characteristics of the mobile radio, namely the mobility rate of the mobile radio. Thus, in accordance with an aspect of the present invention, page messages for a mobile radio are issued on either a location area basis or on a cell area basis, depending on the mobility behavior of the mobile station. Various methods of determining mobility of mobile stations are known and the present invention is not limited to any particular such methodology. Depending on the mobility of any particular radio, either the location area level paging is used or a cell level paging is used.

These, as well as other objects and advantages of this invention, will be more completely understood and appreciated by careful study of the following more detailed description of a presently preferred exemplary embodiment of the invention taken in conjunction with the accompanying drawings, of which:

BRIEF DESCRIPTION OF THE DRAWINGS

FIG. 2 is a table showing an example embodiment of the location update procedure in accordance with an example embodiment of the present invention.

DETAILED DESCRIPTION OF THE DRAWINGS

In the presently preferred embodiment of the invention, the mobility of the various mobile stations is taken into account in determining how the page messaging will be invoked. Since the mobility of mobile stations is not consistent and equal, the mobility rate for each mobile station is determined. This mobility rate is most easily determined based on the frequency of location updating performed by the mobile station. Those mobile stations with a high rate of mobility will perform frequent location updates while others will have a mobility which is relatively lower based on the lack of frequency of location updating. That is, a network which is servicing a mobile station that performs frequent location updates can presume that that mobile station is highly mobile. On the other hand, a network servicing a mobile station which is generally invisible to the system because it only moves within the same cell for long periods of time and therefore rarely performs location updates, can be considered relatively immobile.

The presently preferred embodiment of the present invention employs at least two levels of location registration methodology, location area level registration and cell area level registration. Thus, while traditional systems of registration invoke various forms of location area signaling, the present invention invokes a second level of knowledge, cell-based registration. Depending on the mobility behavior of a mobile station either the location area paging or the cell area paging is employed.

In the traditional system, the network and the mobile station will know the location of the mobile station. In accordance with the preferred embodiment of the present invention, the mobile station adds to this knowledge certain flag and timer information. The flag is set whenever the mobile station selects a new cell without performing a location update. This will occur whenever the mobile station is previously registered in a location area and is moving within that same location area to a new cell in that location area. The flag is reset whenever a location update is performed, namely whenever the mobile station moves to a new location area. The mobile station timer is restarted every time a location update is performed and runs until either a predetermined time value is reached or a location update is performed. The predetermined value timer can be provided by the network or can be pre-programmed into the mobile station. The network may employ a periodic registration timer as the predetermined timer described above.

Figure 1:
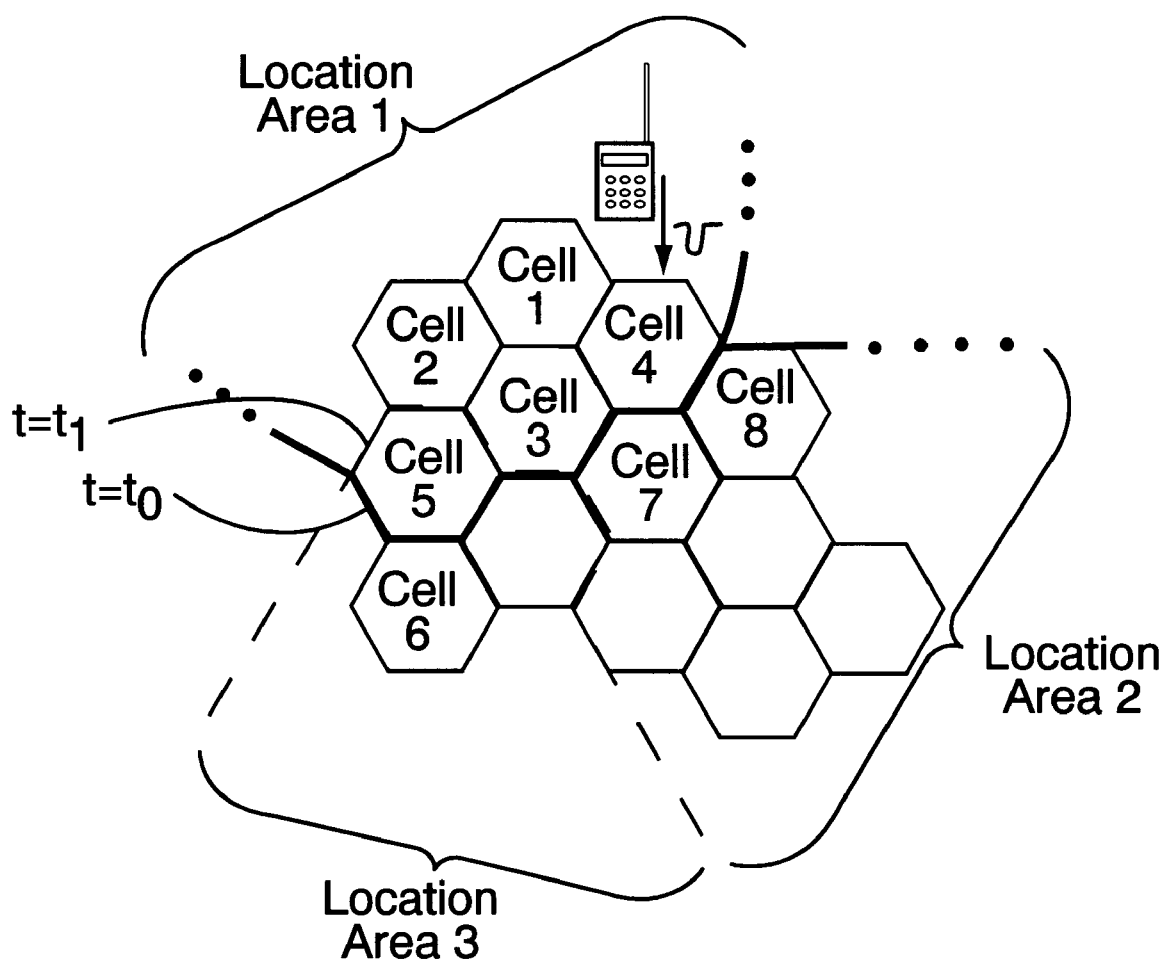
FIG. 1 is a schematic representation of a cellular structure.

FIG. 1 illustrates the general circumstances where the present invention will be employed. A mobile station MS located within a location area 1 moves among the various cells in the location area 1, namely cell 1, cell 2 . . . cell 5. In accordance with prior registration systems, as long as the mobile station remained within location area 1, it could move to any of the cells within location area 1 and still not perform a location update. Then, by way of example only, whenever an incoming call was received for the mobile station, a page message went out on the page channel to all of the cells within a location area 1 in order to reach the mobile station MS within one of those particular cells. Although various methods for drawing the location areas (overlapping, non-overlapping, larger, smaller, etc.) were known, the location areas where generally consistent in defining the smallest area known by the network in which the mobile station resided.

As the mobile station moved from a cell within one location area to another, for example, location area 1 to location area 2, or location area 2 to location area 3, the mobile station performed a location update so the network could identify that the mobile station resided in the new location area.

In FIG. 2, the presently preferred embodiment of the invention is described with respect to the various actions taken by a mobile station in various situations. Boxes 10 and 11 indicate a previous location level identified for a particular mobile station. Box 10 identifies a mobile station that has previously been registered on a location area basis (relatively mobile radios) and Box 11 represents mobile stations previously registered on a cell basis (relatively stationary radios). The headers across the top of FIG. 2 indicate situations in which a mobile station will find itself. In header 12, a mobile station moves into a new cell within an old location area, such as moving from cell 1 to cell 2 within the same location area 1 of FIG. 1. In header 15, a mobile station remains within a same cell but the network reassigns the cell to a new location area, such as within cell 5 of FIG. 1 which is shown assigned to location area 1 at $t=t_0$ and then into location area 3 later on at $t=t_1$. In header 18, the mobile station moves into a new cell and a new location area such as moving from cell 4 in location area 1 to cell 7 in location area 2 of FIG. 1. Finally, in header 21, the mobile station does not necessarily move into a new cell or a new location area but recognizes the expiration of its timer.

In FIG. 2, Boxes 13, 14, 16, 17, 19, 20, 22, and 23 are a table of actions taken by the mobile station under the various header situations 12, 15, 18, and 21 in view of the previous registration levels for the mobile station 10 and 11. Thus, a mobile station that was previously registered on a location area basis 10 performs the following actions:

1) When the mobile station enters a new cell of an old location area 12, the mobile station takes no action 13. This occurs because the mobile station previously updated on a location area basis 10 and has not yet moved into a new location area 12.

2) When the mobile station moves into a new location area of a same cell 15, the mobile station performs a location update 16. The mobile station previously updated on a location area basis 10 but the network has rearranged the geographic region such that the old cell is now in a new location area. This can happen because of cell rearranging. Obviously this is not something that happens every day but rearranging the cells is a quite common task in a growing network.

3) When the mobile station moves into a new cell in a new location area, the mobile station performs a location update 19. Again, the mobile station performs the location update because it previously registered on a location area basis 10 and entered into a new location area 18.

4) When the mobile station does not enter a new cell or new location area but instead recognizes the expiration of its timer 21, the mobile station looks to its flag to determine the flag status. The flag is to be set when the mobile station selects a new cell without performing a location update (i.e., it enters a new cell within an old location area). If the flag is not set in Box 22, the mobile station performs a location update on a cell-level. If the flag is set, no action is taken.

If the mobile station was previously registering on a cell basis as shown in Box 11, the mobile station will react as follows when put in the situations of items 12, 15, 18, and 21:

1) When the mobile station enters a new cell of an old location area 12, the mobile station performs a location update 14. This occurs because the mobile station has started to move into a high mobility condition.

2) When the mobile station remains in an old cell but is reassigned to a new location area 15, the mobile station performs no action 17. This occurs because the mobile station previously registered on a cell-basis 11 and remains in the old cell 15 even though the network has switched the mobile station to a new location area.

3) When the mobile station enters a new cell and a new location area 18, the mobile station performs a location update 20. Because the mobile station previously registered on a cell-basis 11, entering a new cell 18 necessitates a location update 20.

4) When the mobile station recognizes an expiration of its timer 21, it takes no action.

Thus, the mobile station performs location updates differently based on its previous registration level (cell-based or location area-based) and its new situation. Location updates in Boxes 14, 16, 19, and 20 are performed on a location area basis.

In a less-preferred embodiment, the timer employed is the periodic registration timer (rather than a timer internal to the mobile station or a timer provided by the network). In such a case, Box 22 will be different. Thus if, the flag is set in Box 22, the mobile station performs a location update on the location area basis. If the flag is not set in Box 22, the mobile station performs a location update on a cell basis. Further, in the case of the periodic registration timer, Box 23 will indicate the performance of a location update on a cell basis.

Figure 3:
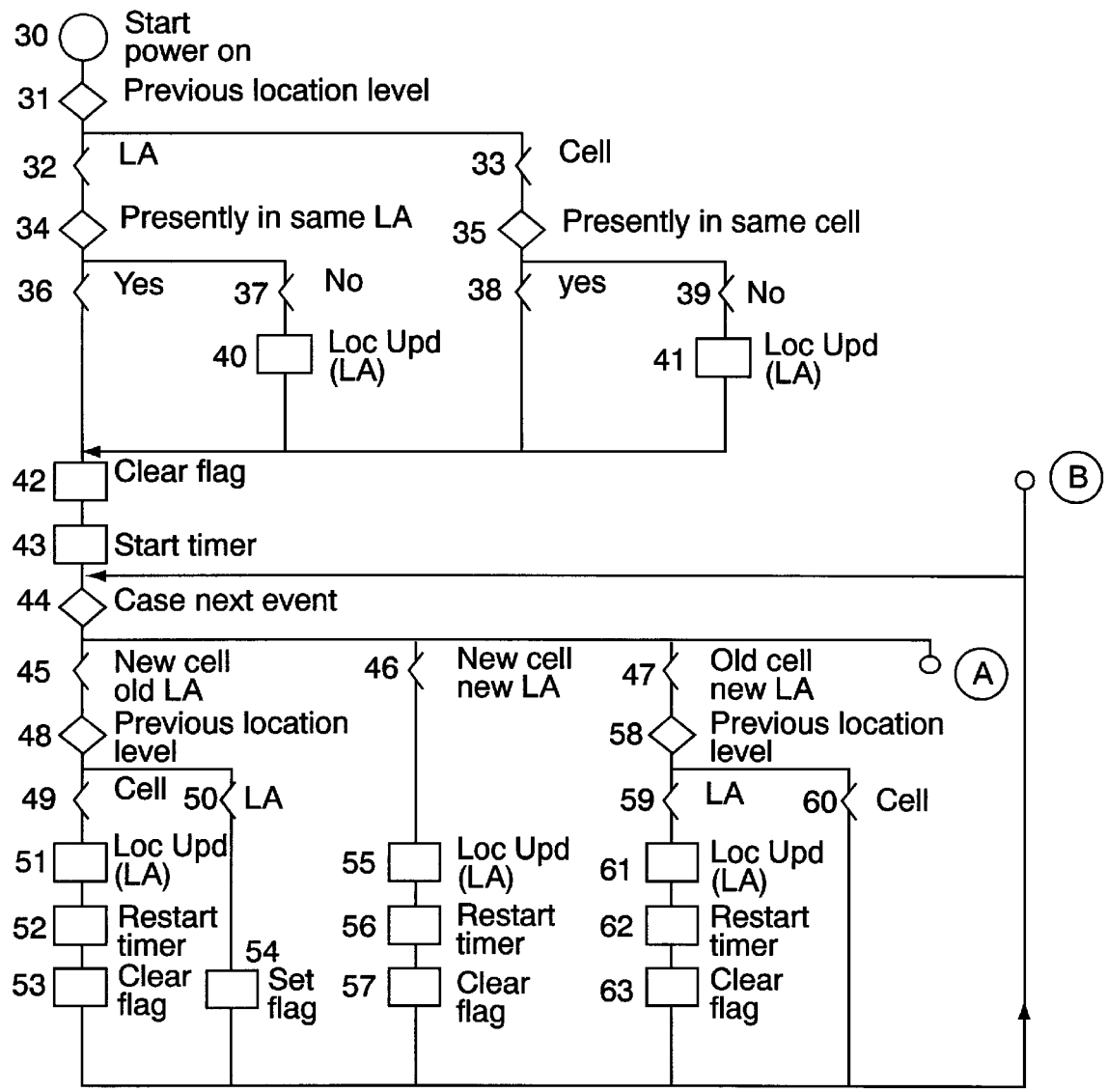
FIGS. 3 and 4 illustrate a flowchart in accordance with an example embodiment of the present invention.
Figure 4:
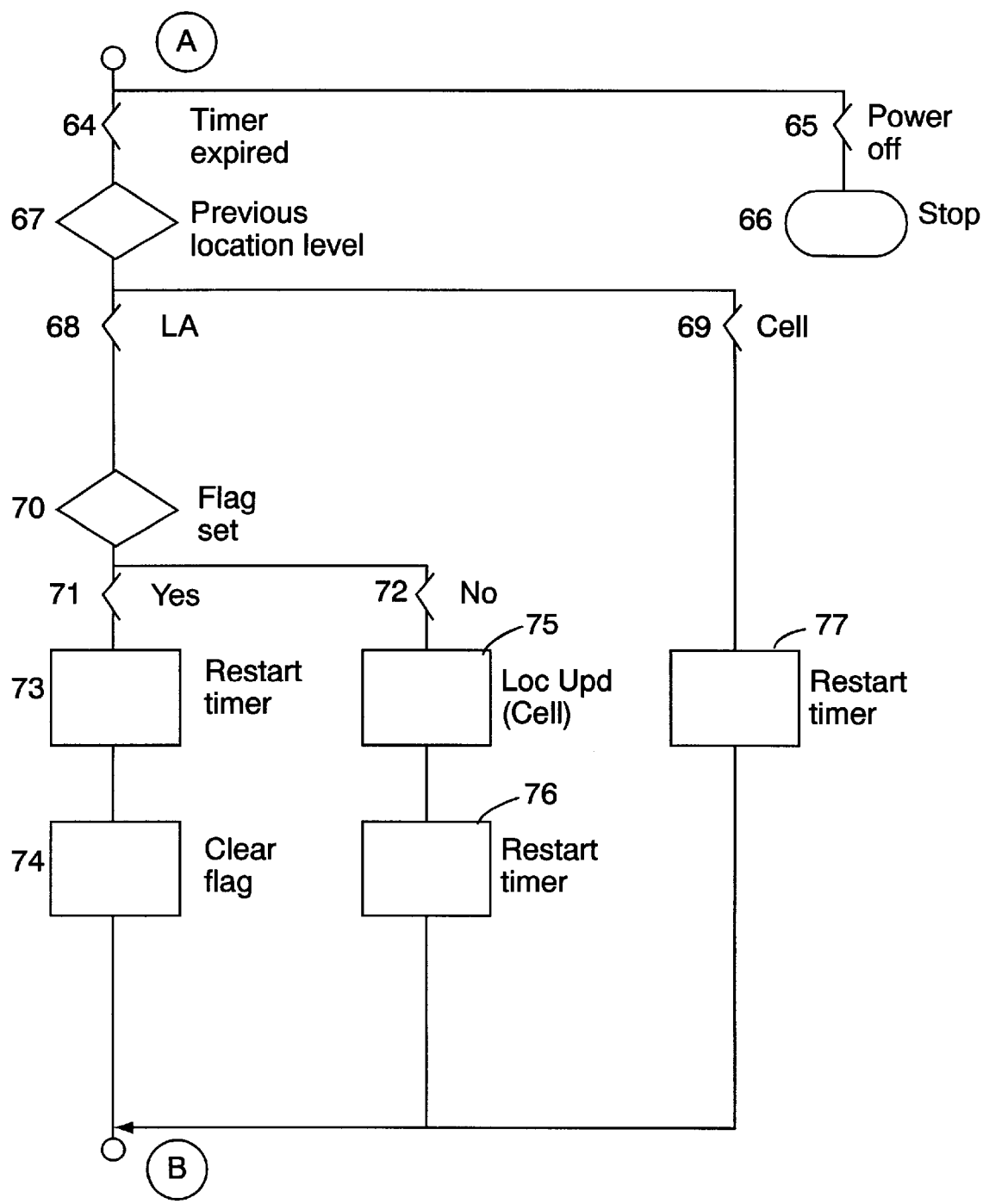

FIGS. 3 and 4 illustrate a flow chart of the presently preferred embodiment. In step 30, during power on, the mobile station checks its previous location and location level at step 31. The previous location level will be either cell-based or location area-based depending on the previous registration level. If the mobile station was previously registered on a location area basis 32, it tests to determine whether it is presently in the same location area 34. If so, in step 36, the mobile station clears the flag 42. If not, in step 37, the mobile station performs a location area update 40 and then clears the flag 42.

If on the other hand the mobile station was registered on a cell-basis 33, the mobile station checks to determine if it is in the same cell as previously 35. If so, at 42 it clears the flag. If not, at 39 it performs a location update on a location area basis in step 41 and then clears the flag at step 42.

After step 42 (clearing the flag), the mobile station starts the timer at step 43 and then tests for the situations identified by headers 12, 15, 18, and 21 at FIG. 2. This test for the mobile station change in situation occurs at step 44 and may result in the mobile station recognizing that it has moved to a new cell in an old location area at step 45 (corresponding to box 12 of FIG. 2), a new cell in a new location area of step 46 (corresponding to block 18 of FIG. 2), an old cell in a new location area at step 47 (corresponding to box 15 of FIG. 2), or a timer expiration condition at point A of FIG. 3 (reference also to FIG. 4) corresponding to the timer expired condition of block 21 in FIG. 2. If the mobile station is moved into a new cell of an old location area at step 45, it determines its previous registration location level at step 48, i.e., whether it registered cell-based or location area-based. If the mobile station was registered on a cell basis at step 49, the mobile station performs a location update on a location area basis at step 51 (corresponding to box 14 of FIG. 2). It then restarts the timer at step 52 and clears the flag at step 53.

On the other hand, if the mobile station at step 48 determines that its previous registration was on a location area basis at step 50, the situation corresponds to box 13 of FIG. 2 and no action is taken other than to set the flag at step 54.

At step 44, the mobile station may determine that it is moved into a new cell of a new location area at step 46 (corresponding to box 18 of FIG. 2). In this case, as shown in FIG. 2, boxes 19 and 20, the mobile station will perform a location update on a location area basis regardless of whether it previously registered on a location area basis (box 10) or a cell basis (box 11). Accordingly, in FIG. 3, after step 46, the mobile station performs a location update on the location area basis of step 55, restarts the timer at step 56 and clears the flag at step 57.

If at step 44, the mobile station gets reassigned into a new location area while remaining in a same cell at step 47 (corresponding to box 15 of FIG. 2), the mobile station determines whether its previous registration was on a location area basis or a cell basis at step 58. If the mobile station registered on a location area basis at step 59 (corresponding to box 16 of FIG. 2), the mobile station performs a location update on a location area basis at step 61, restarts the timer at step 62, and clears the flag at step 63. If, on the other hand, the mobile station determines at step 58 that the previous location level registration was cell-based at step 60, the mobile station takes no action (corresponding to box 17 of FIG. 2). Note, also after step 60, the mobile station does not clear the flag because the mobile station has not entered a new cell.

Point A of FIG. 3, continues on to point A of FIG. 4 such that the flow charts of FIGS. 3 and 4 read together to form a single flow chart. FIG. 4 represents the conditions that occur when the timer expires (corresponding to box 21 of FIG. 2). Mainly, after step 44 of FIG. 3, if the mobile station determines that the timer has expired before movement into a new cell or a new location area, the flow chart proceeds to point A of FIGS. 3 and 4. There, at step 65, if power is turned off, the method stops at step 66. If the timer has expired at step 64, FIG. 2 indicates that the mobile station will either perform a location update, or do nothing, in Boxes 22 or 23 depending on the previous registration level 10 or 11. Thus, the mobile station determines the previous registration location level at step 67 to determine whether the previous registration was on a location area basis (Box 10 of FIG. 2) or a cell basis (Box 11 of FIG. 2). If the previous registration was on a location area basis at step 68, Box 22 of FIG. 2 applies and the mobile station must determine whether the flag is set at the time the timer expires, at step 70. If the flag is set at step 71, the mobile station restarts the timer at step 73, and clears the flag at step 74. If, on the other hand, the flag is not set at step 72 when the timer expires, the mobile station performs the location update on a cell basis at step 75 and restarts the timer at step 76. After steps 74 and 76, the process proceeds to step B of FIG. 4, corresponding to step B of FIG. 3, where the process continues into a test for a next changing condition at step 44.

If at step 67, after the timer has expired, the mobile station detects that its previous registration was on a cell basis at step 69, the mobile station restarts the timer at step 77. Thereafter, it proceeds to point B of FIG. 3.

The timer and flag operations may be incorporated into the processor circuitry already found in traditional mobile radios. Thus, any of the different types of mobile radios may be employed in accordance with the present invention by adding to the already existent processor circuitry software the timer functions, flag functions, and routines consistent with the embodiments described in FIGS. 2–4.

The present invention may also be employed in an alternative embodiment with more than two levels of registration. It is conceivable to have levels between the location area level and the cell level such that mobile station with moderate relative mobility may register on a geographic level between the larger location area and the smaller cell level. In this way, the mobile station might move through a series of levels, each one smaller, such that relatively stationary mobile stations register on a cell level and increasingly mobile mobile stations register on step sized levels leading up to a location area level. This latter embodiment is not necessarily preferred as the gain involved in providing the additional levels of registration may not justify the added complexity for all systems.

In accordance with the present invention, past rates of motion of a mobile station will determine how a mobile station performs location area updates and how the network will respond. The present invention provides an optimal situation in which the unwanted load of, for example, paging into unnecessarily large geographic areas is avoided while also avoiding the unwanted load of requiring all mobile stations to provide location updates on a overly frequent basis.

With reference to the previous description of step 61, it is stated that a mobile on a location area level will register on a location area level when the location area is changed in the cell. This is, of course, a perfectly sound possibility but a different approach would be to force the mobile to register on a cell level. The advantage is that this could be used when there is high page load in the cells, forcing all mobiles (in the cell) to register on the cell level in order to immediately reduce the number of pages to be distributed to the surrounding cells. This makes the feature very nice to use during a temporary high page load.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of location updating a mobile radio residing in a geographically defined cell and a geographically defined location area, comprising:
   a) determining a mobility factor associated with the mobile radio,
   b) setting a timer,
   c) setting a flag if the mobile radio leaves the geographically defined cell without leaving the geographically defined location area;
   d) if the mobility factor suggests the mobile radio is relatively stationary, then:
      1) when the mobile radio leaves the geographically defined cell, performing a location update,
      2) when the mobile radio is reassigned from the geographically defined location area and into a new geographically defined location area, yet remains in the geographically defined cell, abstaining from performing a location update, and
   e) if the mobility factor suggests the mobile radio is relatively mobile, then:
      1) when the mobile radio leaves the geographically defined location area, performing a location update, and
      2) when the mobile radio leaves the geographically defined cell and enters a new geographically defined cell, yet remains in the geographically defined location area, abstaining from performing a location update.

2. A method as in claim 1, wherein step e) further includes the steps of:
   3) when the timer exceeds a predetermined time, testing the flag, and
      A) if the flag is not set, performing a location update based on the geographically defined cell area.

3. A method as in claim 2, further including the step, after step d1) of clearing the flag.

4. A method as in claim 3, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

5. A method as in claim 2, further including the step, after step e1) of clearing the flag.

6. A method as in claim 5, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

7. A method as in claim 2, further including the step, after step e3a) of clearing the flag.

8. A method as in claim 7 further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

9. A method as in claim 2, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

10. A method as in claim 1, further including the step, after step e) of:
    f) repeating steps a) through e) upon the occurrence of any one of:
       i. the mobile radio leaving the geographically defined location area,
       ii. the mobile radio leaving the geographically defined cell, and
       iii. the timer exceeding the predetermined time.

11. A method as in claim 1, wherein step c) includes the step of transmitting to the mobile radio the predetermined time.

12. A method as in claim 1, further including the step of resetting the timer whenever:
    a) the mobile radio is determined to be relatively stationary and enters a new geographically defined cell,
    b) the mobile radio is determined to be relatively mobile and enters a new geographically defined location area.

13. A method as in claim 12, further including the step, after step d1) of resetting the timer.

14. A method as in claim 13, further including the step, after step e) of:
    f) repeating steps a) through e) upon the occurrence of any one of:
       i. the mobile radio leaving the geographically defined location area,
       ii. the mobile radio leaving the geographically defined cell, and
       iii. the timer exceeding the predetermined time.

15. A method as in claim 12, further including the step, after step e1) of resetting the flag.

16. A method as in claim 15, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

17. A method as in claim 12, further including the step, after step e3a) of resetting the flag.

18. A method as in claim 17, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

19. A method as in claim 12, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

20. A method as in claim 1, wherein step e) further includes the steps of:
   3) when the timer exceeds a predetermined time, testing the flag, and
      A) if the flag is set, resetting the timer, and clearing the flag, and
      B) if the flag is not set, performing a location update based on the geographically defined cell area and resetting the timer.

21. A method as in claim 20, further including the step, after step e) of:
   f) repeating steps a) through e) upon the occurrence of any one of:
      i. the mobile radio leaving the geographically defined location area,
      ii. the mobile radio leaving the geographically defined cell, and
      iii. the timer exceeding the predetermined time.

22. A method as in claim 1, wherein the location update of steps d1), d2), e1) and e2) are performed based on the geographically defined location area.

23. A method as in claim 1, wherein the location update of step d3) is performed based on the geographically defined cell.

24. A method as in claim 1, further including the step, within step c), of:
   when the timer exceeds a predetermined time, performing a location update based on the geographically defined cell.

25. A method as in claim 1, wherein step b) includes obtaining a timer value from a periodic registration timer.

26. A mobile radio, comprising:
   a transmission and reception process to receive a categorization identifying a mobility of the radio and to perform location updates to a mobile radio network,
   a timer to clock a predefined time duration, and
   a flag to identify whether the mobile radio has previously left a geographically defined cell without leaving the geographically defined location area, wherein:
      if the categorization identifies the radio as relatively immobile, the mobile radio performs a location update on a location area level whenever the mobile radio enters a new geographically defined cell, and
      if the categorization identifies the radio as relatively mobile, the mobile radio:
         performs a location update on a location area level whenever the mobile radio enters a new location area, and
         performs a location update on a cell level whenever the timer expires and the flag is not set.

27. A method as in claim 24, wherein the mobile radio abstains from performing a location update if:
   the categorization identifies the radio as relatively immobile and the radio enters a new location area without entering a new cell.

28. A method as in claim 24, wherein the mobile radio abstains from performing a location update if:
   the categorization identifies the radio as relatively mobile and the radio enters a new cell without entering a new location area.

29. A method of location updating a mobile radio residing in a geographically defined cell and a geographically defined location area, comprising:
   a) determining a mobility factor associated with the mobile radio,
   b) setting a periodic registration timer,
   c) if the mobility factor suggests the mobile radio is relatively stationary, then:
      1) when the mobile radio leaves the geographically defined cell, performing a location update on a location area basis,
      2) when the mobile radio and reassigned from the geographically defined location area and into a new geographically defined location area, yet remains in the geographically defined cell, abstaining from performing a location update, and
   d) if the mobility factor suggests the mobile radio is relatively mobile, then:
      1) when the mobile radio leaves the geographically defined location area and leaves the geographically defined cell, performing a location update on a location area basis,
      2) when the mobile radio leaves the geographically defined location area but does not leave the geographically defined cell, performing a location update on a cell basis; and
      3) when the mobile radio leaves the geographically defined cell and enters a new geographically defined cell, yet remains in the geographically defined location area, abstaining from performing a location update.

30. A method as in claim 29, further including the step, within step c), of:
   when the timer exceeds a predetermined time, performing a location update based on the geographically defined cell.

31. A method as in claim 29, wherein step b) includes obtaining a timer value from a periodic registration timer.

* * * * *